(12) United States Patent
Shinozaki et al.

(10) Patent No.: US 10,819,189 B2
(45) Date of Patent: Oct. 27, 2020

(54) AUTOMOTIVE ROTARY ELECTRIC MACHINE WITH ANNULAR LIQUID COOLANT CHANNEL FOR STATOR AND POWER CONVERTING APPARATUS

(71) Applicant: MITSUBISHI ELECTRIC CORPORATION, Chiyoda-ku (JP)

(72) Inventors: Masaru Shinozaki, Chiyoda-ku (JP); Yugo Asai, Chiyoda-ku (JP); Yusuke Kimoto, Chiyoda-ku (JP); Hiroyuki Ushifusa, Chiyoda-ku (JP); Yoshiaki Kitta, Chiyoda-ku (JP); Yoshiyuki Deguchi, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/308,876

(22) PCT Filed: Mar. 28, 2017

(86) PCT No.: PCT/JP2017/012708
§ 371 (c)(1),
(2) Date: Dec. 11, 2018

(87) PCT Pub. No.: WO2018/003214
PCT Pub. Date: Jan. 4, 2018

(65) Prior Publication Data
US 2019/0229584 A1    Jul. 25, 2019

(30) Foreign Application Priority Data

Jun. 29, 2016    (JP) ................................ 2016-128537

(51) Int. Cl.
*H02K 9/00* (2006.01)
*H02K 9/20* (2006.01)
(Continued)

(52) U.S. Cl.
CPC ............. *H02K 9/20* (2013.01); *F28D 15/025* (2013.01); *H02K 9/19* (2013.01); *H02K 11/33* (2016.01); *Y02T 10/64* (2013.01)

(58) Field of Classification Search
CPC .. H02K 9/00; H02K 9/08; H02K 9/12; H02K 9/14; H02K 9/16; H02K 9/193; H02K 9/19; H02K 9/197; H02K 5/20
(Continued)

(56) References Cited

U.S. PATENT DOCUMENTS 6,222,289 B1 *   4/2001   Adames ................... H02K 5/20
                                                                 310/52
8,912,694 B2 *  12/2014   Miura ...................... H02K 5/20
                                                                 310/54
(Continued)

FOREIGN PATENT DOCUMENTS

JP    52-41808       3/1977
JP    52-97458 A     8/1977
(Continued)

OTHER PUBLICATIONS

International Search Report dated Jun. 20, 2017 in PCT/JP2017/012708 filed Mar. 28, 2017.
(Continued)

*Primary Examiner* — Maged M Almawri
(74) *Attorney, Agent, or Firm* — Xsensus LLP

(57) ABSTRACT

A cooling apparatus includes: an annular internal liquid coolant flow channel that is mounted to a rotary electric machine main body, and in which an internal liquid coolant circulates around an outer circumference of the rotary electric machine main body, and an external liquid coolant passage portion through which an external liquid coolant passes, the external liquid coolant passage portion is connected to the internal liquid coolant flow channel by a
(Continued)

connecting portion that is positioned vertically higher than the rotary electric machine main body, and the electric power converting apparatus includes a heat radiating surface that releases heat that is generated in the electric power converting apparatus, the electric power converting apparatus being mounted to the cooling apparatus such that the heat radiating surface and the internal liquid coolant can exchange heat at a position that is vertically lower than the connecting portion.

21 Claims, 9 Drawing Sheets

(51) Int. Cl.
  *H02K 11/33* (2016.01)
  *H02K 9/19* (2006.01)
  *F28D 15/02* (2006.01)
(58) Field of Classification Search
  USPC .................................... 310/52, 54, 89, 60 A
  See application file for complete search history.

(56) References Cited

U.S. PATENT DOCUMENTS

| | | | | |
|---|---|---|---|---|
| 2005/0023909 | A1* | 2/2005 | Cromas | H02K 9/19 310/58 |
| 2005/0268464 | A1* | 12/2005 | Burjes | F28F 3/12 29/890.035 |
| 2005/0285456 | A1* | 12/2005 | Amagi | H02K 5/08 310/43 |
| 2009/0315415 | A1* | 12/2009 | Elnar | H02K 9/22 310/54 |
| 2012/0217826 | A1* | 8/2012 | Jiang | H02K 5/20 310/54 |
| 2013/0169077 | A1* | 7/2013 | Takei | H02K 5/20 310/54 |
| 2013/0328423 | A1* | 12/2013 | Ikeda | H02K 5/20 310/54 |
| 2014/0183988 | A1* | 7/2014 | Kulkarni | H02K 9/19 310/54 |
| 2016/0056683 | A1* | 2/2016 | Nakanishi | H02K 5/18 310/54 |

FOREIGN PATENT DOCUMENTS

| | | |
|---|---|---|
| JP | 5-207704 A | 8/1993 |
| JP | 9-65596 A | 3/1997 |
| JP | 9-74715 A | 3/1997 |
| JP | 9-74716 A | 3/1997 |
| JP | 9-201010 A | 7/1997 |
| JP | 2003-61331 A | 2/2003 |
| JP | 2004-357472 A | 12/2004 |
| JP | 2016-46913 A | 4/2016 |

OTHER PUBLICATIONS

Japanese Office Action dated Oct. 5, 2017 in Patent Application No. 2017-548242 (with unedited computer-generated English translation).

* cited by examiner

AUTOMOTIVE ROTARY ELECTRIC MACHINE WITH ANNULAR LIQUID COOLANT CHANNEL FOR STATOR AND POWER CONVERTING APPARATUS

TECHNICAL FIELD

The present invention relates to an automotive rotary electric machine such as an electric motor, or a generator, etc., and particularly relates to a cooling construction for a heat-generating body such as a stator or an electric power converting apparatus that performs power conversion, etc.

BACKGROUND ART

In conventional rotary machines, cooling apparatuses are included which are constituted by: a cooler that is mounted so as to cover an outer circumference of an annular stator in a state in which a heat-receiving surface is placed in close contact with an outer circumferential wall surface of the stator, a coolant that receives heat that is generated by the stator and vaporizes being sealed inside the cooler; a radiator that is disposed above the cooler so as to communicate with the cooler through a communicating pipe, the vaporized coolant flowing into the radiator from the cooler by means of the communicating pipe, and that vaporized coolant being condensed into a liquid in the radiator and returned to the cooler by means of the communicating pipe; and a blower that is disposed on a front surface of the radiator so as to blow air toward the radiator.

CITATION LIST

Patent Literature

Patent Literature 1: Japanese Patent Laid-Open No. HEI 9-74715 (Gazette)

SUMMARY OF THE INVENTION

Problem to be Solved by the Invention

In the conventional rotary machine, because the heat received by the cooler is effectively radiated using the radiator and the blower, one problem has been that overall size of the apparatus is increased. Because the amount of heat generated in an electric power converting apparatus that performs power conversion increases together with increases in output of the rotary machine in particular, large radiators and blowers are required, and there has been a risk that this will lead to further increases in the overall size of the apparatus.

The present invention aims to solve the above problems and an object of the present invention is to provide an automotive rotary electric machine in which a rotary electric machine main body and an electric power converting apparatus can be cooled effectively while suppressing increases in apparatus size.

Means for Solving the Problem

An automotive rotary electric machine according to the present invention is an automotive rotary electric machine in which a rotary electric machine main body performs rotational driving on a vehicle using electric power that is converted by an electric power converting apparatus, the automotive rotary electric machine including a cooling apparatus that cools the rotary electric machine main body, wherein: the cooling apparatus includes: an annular internal liquid coolant flow channel that is mounted to the rotary electric machine main body, and in which an internal liquid coolant circulates around an outer circumference of the rotary electric machine main body; and an external liquid coolant passage portion through which an external liquid coolant passes; the external liquid coolant passage portion is connected to the internal liquid coolant flow channel by a connecting portion that is positioned vertically higher than the rotary electric machine main body; and the electric power converting apparatus includes a heat radiating surface that releases heat that is generated in the electric power converting apparatus, the electric power converting apparatus being mounted to the cooling apparatus such that the heat radiating surface and the internal liquid coolant can exchange heat at a position that is vertically lower than the connecting portion.

Effects of the Invention

Because the internal liquid coolant that has received heat from the electric motor main body and the electric power converting apparatus exchanges heat with the external liquid coolant at the connecting portion between the external liquid coolant passage portion and the liquid coolant flow channel, efficient heat radiation is enabled. Thus, a radiator and blower that give rise to increases in size are no longer necessary, enabling the electric motor main body and the electric power converting apparatus to be cooled effectively while suppressing increases in the size of the electric motor even if the amount of heat generated in the electric power converting apparatus increases together with increases in output of the electric motor main body.

DESCRIPTION OF EMBODIMENTS

Embodiment 1

Figure 1:
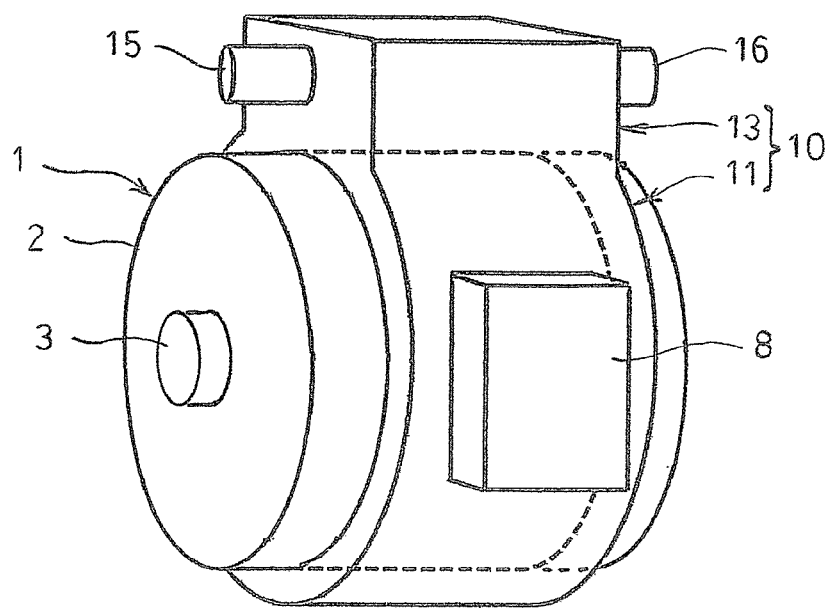
FIG. 1 is an oblique projection that shows an electric motor according to Embodiment 1 of the present invention.
Figure 2:
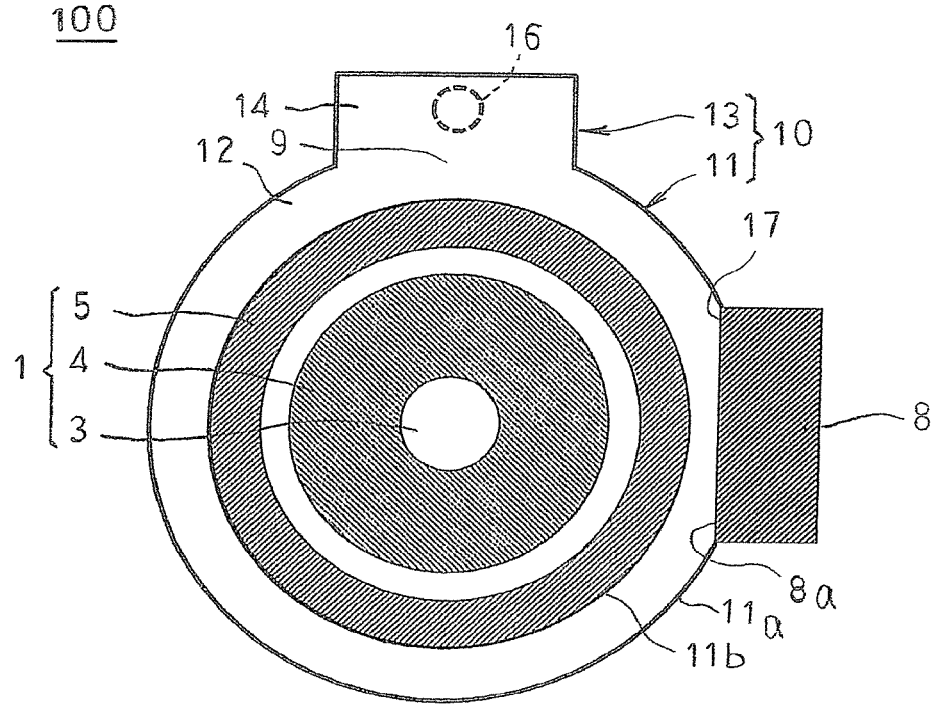
FIG. 2 is a lateral cross section that shows the electric motor according to Embodiment 1 of the present invention.
Figure 3:
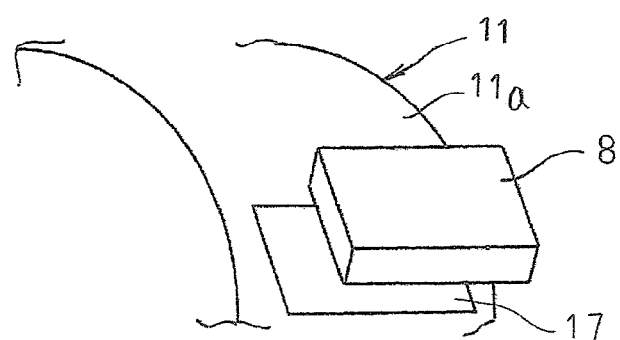
FIG. 3 is a partial oblique projection that explains a state of the electric motor according to Embodiment 1 of the present invention before mounting of an electric power converting apparatus.
Figure 4:
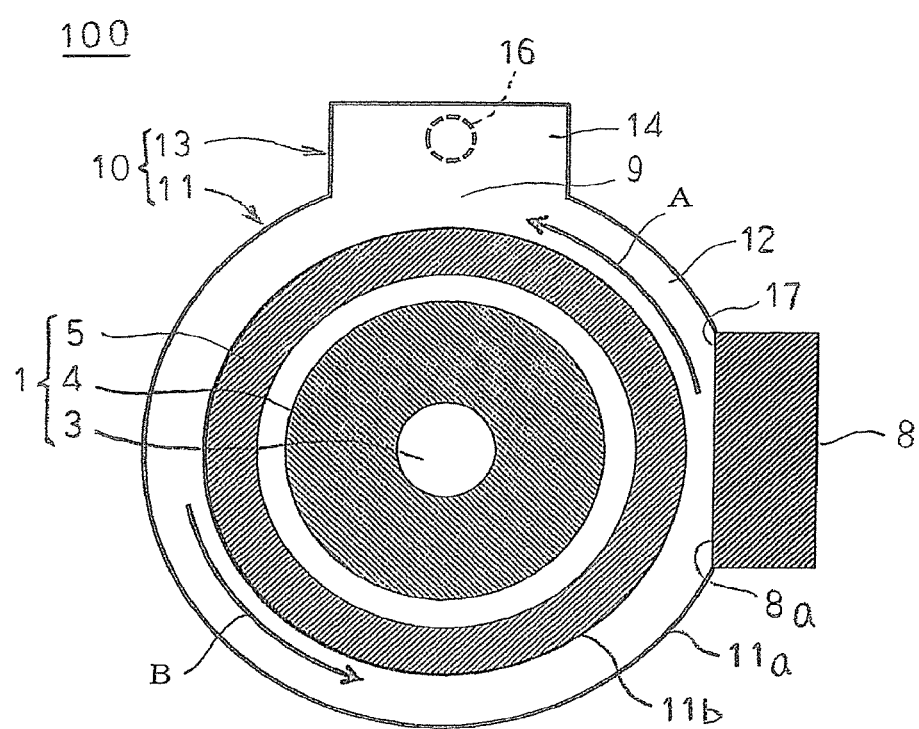
FIG. 4 is a lateral cross section that explains flow of coolant in the electric motor according to Embodiment 1 of the present invention.
Figure 5:
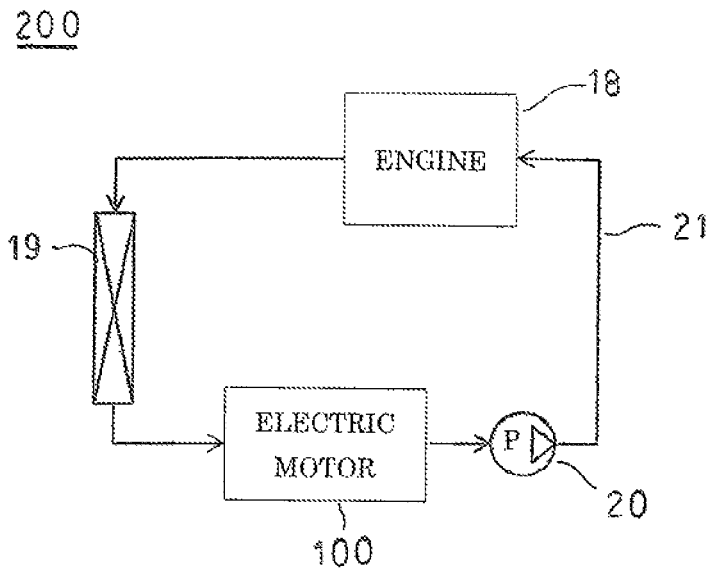
FIG. 5 is a first coolant circuit diagram for a cooling system according to Embodiment 1 of the present invention.
Figure 6:
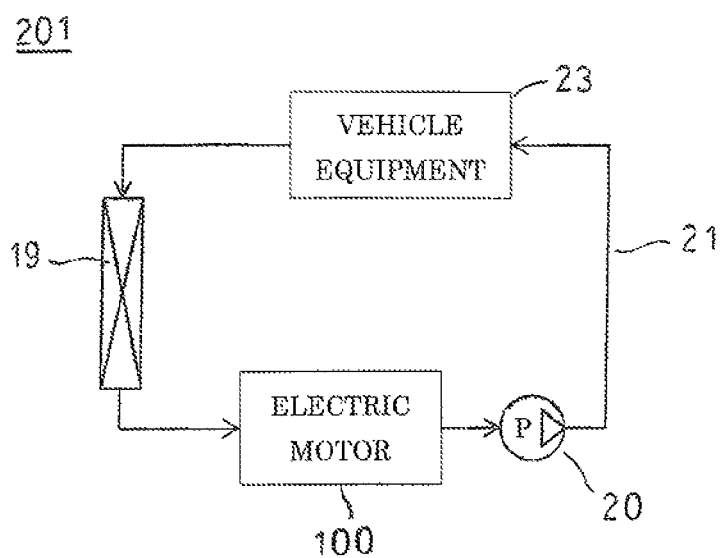
FIG. 6 is a second coolant circuit diagram for a cooling system according to Embodiment 1 of the present invention.

FIG. 1 is an oblique projection that shows an electric motor according to Embodiment 1 of the present invention, FIG. 2 is a lateral cross section that shows the electric motor according to Embodiment 1 of the present invention, FIG. 3 is a partial oblique projection that explains a state of the electric motor according to Embodiment 1 of the present invention before mounting of an electric power converting apparatus, FIG. 4 is a lateral cross section that explains flow of coolant in the electric motor according to Embodiment 1 of the present invention, FIG. 5 is a first coolant circuit diagram for a cooling system according to Embodiment 1 of the present invention, and FIG. 6 is a second coolant circuit diagram for a cooling system according to Embodiment 1 of the present invention. Moreover, a "lateral cross section" is a diagram representing a cross section that is perpendicular to a central axis of a rotating shaft of the electric motor.

In FIGS. 1 and 2, an electric motor 100 that functions as an automotive rotary electric machine is a driving electric motor that is mounted to an electric vehicle, a hybrid vehicle, or a fuel cell vehicle, for example, and includes: an electric motor main body 1 that functions as a rotary electric machine main body; an electric power converting apparatus 8 that converts direct-current power from an external electric power supply into electric driving power for the electric motor main body 1, such as three-phase alternating-current power, for example; and a cooling apparatus 10 that cools the electric motor main body 1 and the electric power converting apparatus 8.

The electric motor main body 1 includes: a housing 2; a rotor 4 that is disposed inside the housing 2 so as to be fixed to a rotating shaft 3 that is rotatably supported by the housing 2; and a stator 5 that is produced so as to have an annular shape, and that is held by the housing 2 so as to be clamped by the housing 2 from two axial directions so as to be disposed so as to be coaxial to the rotor 4 and surround the rotor 4 such that an air gap is interposed between the stator 5 and the rotor 4, the electric motor main body 1 being mounted to an automobile such that an axial center of the rotating shaft 3 is horizontal. Although not shown here, the stator 5 includes an annular stator core; and a stator winding that is mounted to the stator core.

Although not shown, the electric power converting apparatus 8 includes: electrical components such as a power module that includes switching elements such as insulated gate bipolar transistors (IGBTs), a controlling circuit board that controls driving of the power module, etc.; and a housing that houses the electrical components, and that protects the electrical components from external dust, etc.

The cooling apparatus 10 includes: a liquid coolant flow channel 11 that constitutes an internal liquid coolant flow channel inside which an internal liquid coolant 12 is sealed so as to enable cycling, and that is disposed so as to enable heat-generating bodies such as the stator 5, the electric power converting apparatus 8, etc., to exchange heat with the internal liquid coolant 12; and an external liquid coolant passage portion 13 that is configured so as to enable an external liquid coolant 14 to flow, and that is disposed in a state that is connected to the liquid coolant flow channel 11. Here, radiator cooling water, a long-life coolant (LLC), or antifreeze, for example, can be used as the internal liquid coolant 12 and the external liquid coolant 14.

The liquid coolant flow channel 11 is configured so as to have an annular tubular body that has a rectangular flow channel cross section in which openings at two axial ends of a cylindrical outer circumferential wall 11a and a cylindrical inner circumferential wall 11b that have different diameters that are disposed coaxially are closed by a pair of end plates, is fixed around an outer circumference of the stator 5 by press-fitting, and is disposed so as to be coaxial to the stator 5. An opening is formed on a vertically upper portion position of the outer circumferential wall 11a. Moreover, the opening on the outer circumferential wall 11a is positioned vertically higher than the rotary electric machine main body 1.

The external liquid coolant passage portion 13 is configured so as to have a rectangular parallelepiped box body that has an opening on a lower surface, is disposed on a vertically upper portion of the liquid coolant flow channel 11 such that the opening thereof is aligned with the opening on the outer circumferential wall 11a, and is produced integrally with the liquid coolant flow channel 11 so as to communicate with the liquid coolant flow channel 11. An inflow port 15 is mounted to a first axial end surface of the external liquid coolant passage portion 13 such that an axial center of the port is parallel to an axial center of the rotating shaft 3. An outflow port 16 is mounted to a second axial end surface of the external liquid coolant passage portion 13 so as to be coaxial to the inflow port 15. The internal liquid coolant 12 that flows through the liquid coolant flow channel 11 and the external liquid coolant 14 that flows through the external liquid coolant passage portion 13 are thereby able to mix together through the openings, i.e., a connecting portion 9 between the liquid coolant flow channel 11 and the external liquid coolant passage portion 13.

As shown in FIG. 3, the electric power converting apparatus 8 is mounted to the outer circumferential wall 11a of the liquid coolant flow channel 11 so as to have a sealing member (not shown) interposed so as to seal an opening portion 17 that is formed on the outer circumferential wall 11a. A heat radiating surface 8a of the electric power converting apparatus 8 thereby constitutes a portion of the liquid coolant flow channel 11, and the internal liquid coolant 12 directly contacts the heat radiating surface 8a of the electric power converting apparatus 8. Here, the electric power converting apparatus 8 is disposed on a first side of the outer circumferential wall 11a in a horizontal direction of the rotating shaft 3 at a vertical height position that is similar or identical to that of the rotating shaft 3 when viewed from an axial direction of the rotating shaft 3.

Moreover, the electric power converting apparatus 8 may be mounted to the outer circumferential wall 11a without disposing the opening portion 17, by interposing grease or a heat-conducting sheet between the heat radiating surface 8a of the electric power converting apparatus 8 and the outer circumferential wall 11a of the liquid coolant flow channel 11. Screws, brazing, welding, etc., can be used as a fixing means therefor.

Next, operation of the electric motor 100 will be explained.

The direct-current power from the external electric power supply is converted into three-phase alternating-current power by the electric power converting apparatus 8, and is supplied to the stator 5. Rotating magnetic fields are thereby applied to the rotor 4, driving the rotor 4 to rotate. Here, electric current is passed through the stator winding, generating heat in the stator winding.

The heat generated in the stator winding is transferred to the stator core, and is transferred to the internal liquid coolant 12 by means of the inner circumferential wall 11b of the liquid coolant flow channel 11. Heat generated in the rotor 4 is transferred to the stator 5, and is transferred to the internal liquid coolant 12 by means of the inner circumferential wall 11b of the liquid coolant flow channel 11. In addition, the power module, which performs switching, generates heat in the electric power converting apparatus 8. A portion of the heat that is generated by the power module is radiated to atmospheric air, but most of it is transferred to the internal liquid coolant 12 by means of the heat radiating surface 8a.

Because heat is generated approximately uniformly in a circumferential direction in the stator 5, the internal liquid coolant 12 has a uniform temperature distribution in the circumferential direction from the heat generated only in the stator 5. Because the heat generated in the electric power converting apparatus 8, on the other hand, is transferred to the internal liquid coolant 12 only in one portion in the circumferential portion, the temperature of the internal liquid coolant 12 in the vicinity of the electric power converting apparatus 8 is relatively higher, giving rise to temperature differences in the internal liquid coolant 12 in the circumferential direction. The density of the internal liquid coolant 12 is reduced due to the temperature rising, giving rise to buoyancy. Thus, as indicated by an arrow A in FIG. 4, the internal liquid coolant 12 that receives the heat generated in the electric power converting apparatus 8 rises vertically upward through the liquid coolant flow channel 11, and contacts the external liquid coolant 14 that has flowed into the external liquid coolant passage portion 13 through the inflow port 15 at the connecting portion 9 between the liquid coolant flow channel 11 and the external liquid coolant passage portion 13. The internal liquid coolant 12 exchanges heat with the external liquid coolant 14, is reduced in temperature, and descends through the liquid coolant flow channel 11, as indicated by an arrow B in FIG. 4. A convection current thereby arises in the internal liquid coolant 12 that is sealed inside the liquid coolant flow channel 11.

Here, the external liquid coolant 14, which is forcibly circulated through the refrigerant circuit by a pump 20 (described below), flows into the external liquid coolant passage portion 13 from the inflow port 15, and flows out through the outflow port 16. Thus, the external liquid coolant 14 that flows through the external liquid coolant passage portion 13 has a flow that is forcibly circulated, and the flow speed thereof is high compared to the flow of the internal liquid coolant 12 that is convecting through the liquid coolant flow channel 11. In addition, the directions of flow are different in the external liquid coolant 14 that flows through the external liquid coolant passage portion 13 and in the internal liquid coolant 12 that is convecting through the liquid coolant flow channel 11. A portion of the external liquid coolant 14 thereby mixes together the internal liquid coolant 12, facilitating heat exchange.

In this manner, the heat generated in the electric motor main body 1 and the electric power converting apparatus 8 is received by the internal liquid coolant 12 that circulates through the liquid coolant flow channel 11. The heat that is received by the internal liquid coolant 12 is transferred to the external liquid coolant 14 at the connecting portion 9 between the liquid coolant flow channel 11 and the external liquid coolant passage portion 13. Then, the external liquid coolant 14 that has increased in temperature due to the transfer of the heat that is received by the internal liquid coolant 12 flows out through the outflow port 16. The electric motor main body 1 and the electric power converting apparatus 8 are thereby cooled.

Next, cooling systems according to Embodiment 1 will be explained. Moreover, a first coolant circuit 200, which is shown in FIG. 5, is a cooling system that cools an engine 18, and a second coolant circuit 201, which is shown in FIG. 6, is a cooling system that cools other vehicle equipment 23 that requires cooling, such as batteries, step-down converters, and vehicle chargers, for example, rather than an engine 18.

As shown in FIG. 5, the first coolant circuit 200 according to the present cooling system is configured such that an electric motor 100, an engine 18, a radiator 19, and a pump 20 are linked by liquid coolant piping 21. An external liquid coolant 14 is conveyed under pressure from the pump 20 to circulate through the coolant circuit. The external liquid coolant 14 that is discharged from the pump 20 flows into the engine 18, and increases in temperature due to receiving heat generated in the engine 18, and then flows into the radiator 19. Next, the external liquid coolant 14 exchanges heat with external air in the radiator 19, is reduced in temperature, and flows into the external liquid coolant passage portion 13 through the inflow port 15. Next, the external liquid coolant 14 exchanges heat with the internal liquid coolant 12 at the connecting portion 9 between the liquid coolant flow channel 11 and the external liquid coolant passage portion 13, is increased in temperature, flows out through the outflow port 16, and is returned to the pump 20. In other words, the external liquid coolant passage portion 13 is connected to the vehicle engine 18, and the external liquid coolant 14 cools the engine 18.

As shown in FIG. 6, the second coolant circuit 201 according to the present cooling system is configured such that an electric motor 100, vehicle equipment 23, a radiator 19, and a pump 20 are linked by liquid coolant piping 21. An external liquid coolant 14 is conveyed under pressure from the pump 20 to circulate through the coolant circuit. The external liquid coolant 14 that is discharged from the pump 20 flows into the vehicle equipment 23, and increases in temperature due to receiving heat generated in the vehicle equipment 23, and then flows into the radiator 19. Next, the external liquid coolant 14 exchanges heat with external air in the radiator 19, is reduced in temperature, and flows into the external liquid coolant passage portion 13 through the inflow port 15. Next, the external liquid coolant 14 exchanges heat with the internal liquid coolant 12 at the connecting portion 9 between the liquid coolant flow channel 11 and the external liquid coolant passage portion 13, is increased in temperature, flows out through the outflow port 16, and is returned to the pump 20.

According to Embodiment 1, a cooling apparatus 10 includes: an annular liquid coolant flow channel 11 that is filled with an internal liquid coolant 12 so as to enable circulation; and an external liquid coolant passage portion 13 through which an external liquid coolant 14 passes. The liquid coolant flow channel 11 is configured so as to enable heat generated by an electric motor main body 1 and a electric power converting apparatus 8 to be received in a process by which the internal liquid coolant 12 circulates through the liquid coolant flow channel 11. The external liquid coolant passage portion 13 is positioned vertically higher than the liquid coolant flow channel 11, and is connected to the liquid coolant flow channel 11. Thus, because the internal liquid coolant 12 that has received heat from the electric motor main body 1 and the electric power converting apparatus 8 rises through the liquid coolant flow channel 11, and exchanges heat with the external liquid coolant 14 at the connecting portion 9 between the external liquid coolant passage portion 13 and the liquid coolant flow channel 11, efficient heat radiation is enabled. Here, "heat exchange" means that heat transfers from a high-temperature liquid coolant to a low-temperature liquid coolant by mixing, exchange, agitation, contact, etc., between the internal liquid coolant 12 and the external liquid coolant 14. Thus, a radiator and blower that give rise to increases in size are no longer necessary, enabling the electric motor main body 1 and the electric power converting apparatus 8 to be cooled effectively while suppressing increases in the size of the electric motor 100 even if the amount of heat generated in the electric power converting apparatus 8 increases together with increases in output of the electric motor main body 1.

Because the liquid coolant flow channel 11 is disposed so as to surround an outer circumference of the stator 5, the entire electric motor main body 1 can be cooled effectively without giving rise to localized high-temperature positions on the stator 5.

Embodiment 2

Figure 7:
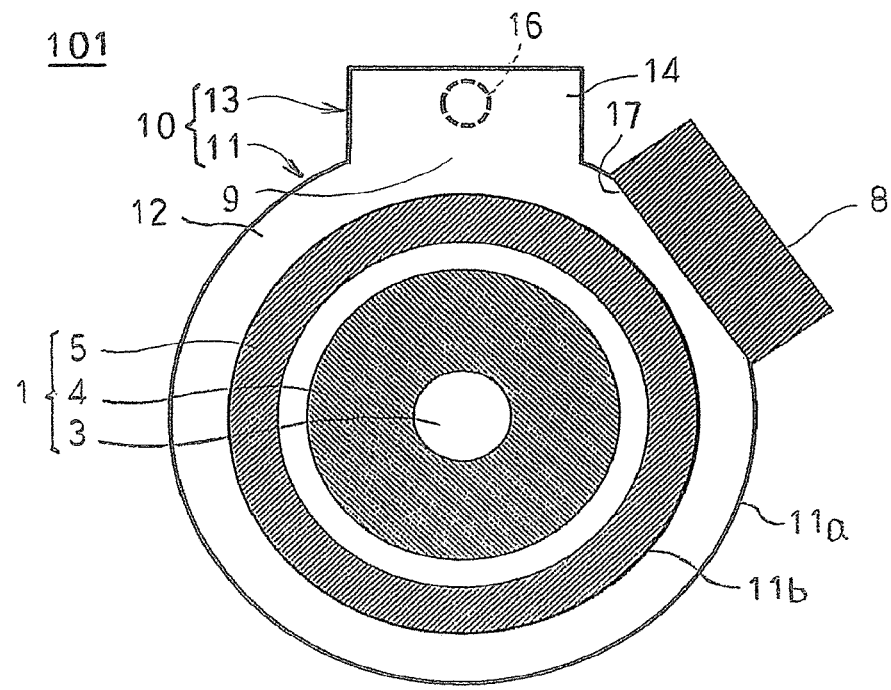
FIG. 7 is a lateral cross section that shows an electric motor according to Embodiment 2 of the present invention.

FIG. 7 is a lateral cross section that shows an electric motor according to Embodiment 2 of the present invention.

In FIG. 7, an electric power converting apparatus 8 is mounted to an outer circumferential wall 11*a* of a liquid coolant flow channel 11 so as to cover an opening portion 17 on the outer circumferential wall 11*a* at a vertical height position between a rotating shaft 3 and an external liquid coolant passage portion 13.

Moreover, a remainder of the configuration is configured in a similar or identical manner to that of Embodiment 1 above.

In an electric motor 101 that is configured in this manner, because the electric power converting apparatus 8 is positioned vertically lower than the external liquid coolant passage portion 13, the internal liquid coolant 12 that has received heat generated in the electric power converting apparatus 8 and has risen in temperature rises through the liquid coolant flow channel 11, and exchanges heat with the external liquid coolant 14 at the connecting portion 9 between the external liquid coolant passage portion 13 the liquid coolant flow channel 11.

Consequently, similar or identical effects to those in Embodiment 1 above can also be achieved in Embodiment 2.

Embodiment 3

Figure 8:
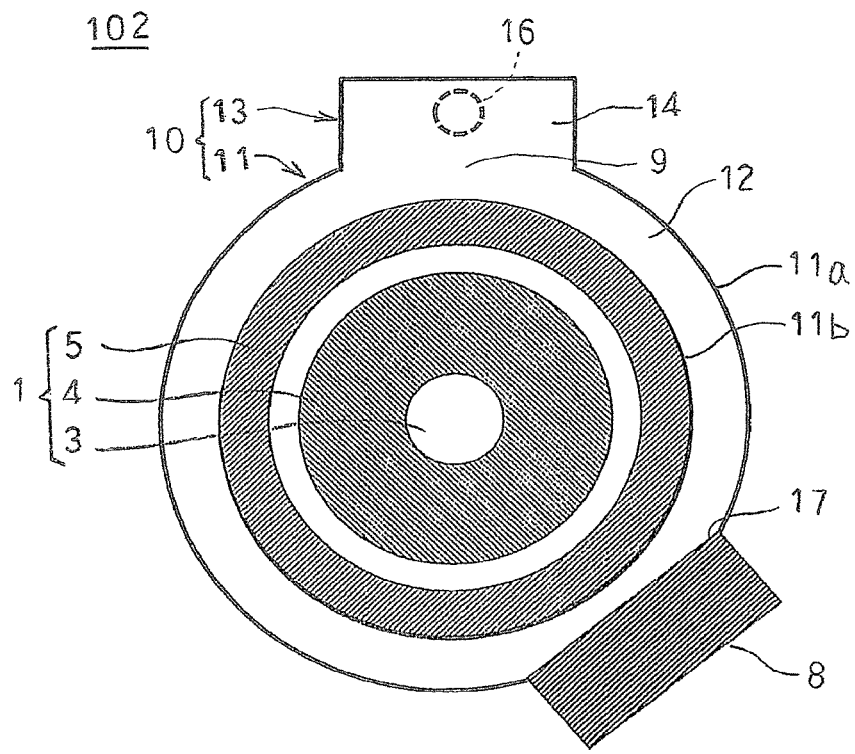
FIG. 8 is a lateral cross section that shows an electric motor according to Embodiment 3 of the present invention.

FIG. 8 is a lateral cross section that shows an electric motor according to Embodiment 3 of the present invention.

In FIG. 8, an electric power converting apparatus 8 is mounted to an outer circumferential wall 11*a* of a liquid coolant flow channel 11 so as to cover an opening portion 17 on the outer circumferential wall 11*a* at a height position that is vertically lower than a rotating shaft 3.

Moreover, a remainder of the configuration is configured in a similar or identical manner to that of Embodiment 1 above.

In an electric motor 102 that is configured in this manner, because the electric power converting apparatus 8 is positioned vertically lower than the external liquid coolant passage portion 13, the internal liquid coolant 12 that has received heat generated in the electric power converting apparatus 8 and has risen in temperature rises through the liquid coolant flow channel 11, and exchanges heat with the external liquid coolant 14 at the connecting portion 9 between the external liquid coolant passage portion 13 the liquid coolant flow channel 11.

Consequently, similar or identical effects to those in Embodiment 1 above can also be achieved in Embodiment 3.

According to Embodiment 3, the electric power converting apparatus 8 is positioned at a height position that is vertically lower than the rotating shaft 3. Thus, in Embodiment 3, because the distance between the electric power converting apparatus 8 and the external liquid coolant passage portion 13 is increased compared to Embodiment 1, increasing nonuniformity of the temperature distribution inside the liquid coolant flow channel 11, flow speed of convection that arises due to density variations is higher, enabling higher heat radiating effects to be achieved.

Embodiment 4

Figure 9:
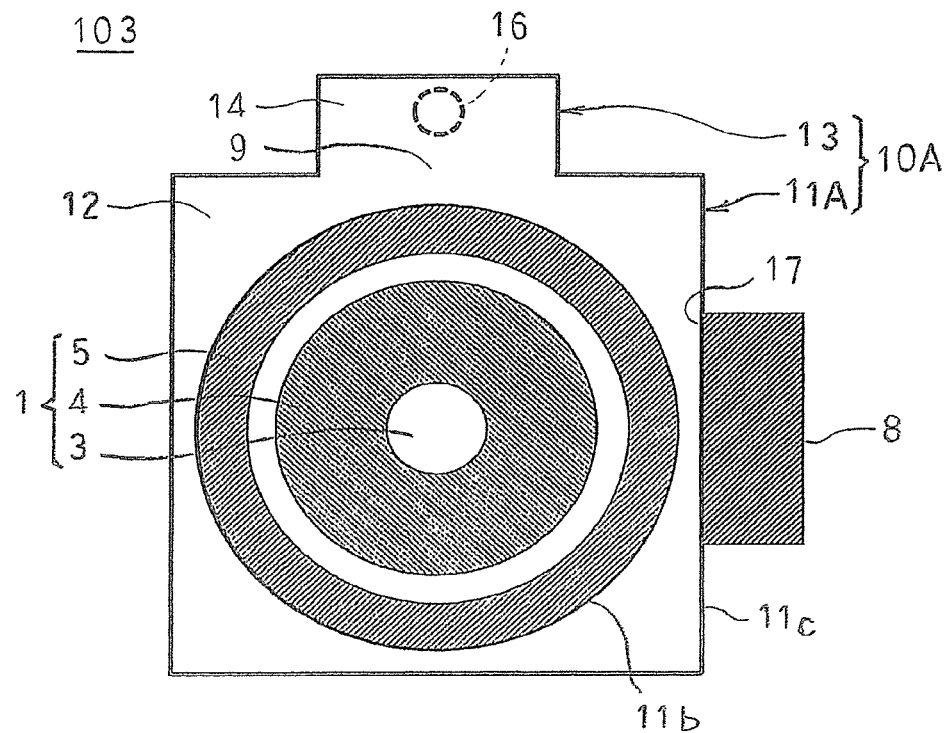
FIG. 9 is a lateral cross section that shows an electric motor according to Embodiment 4 of the present invention.

FIG. 9 is a lateral cross section that shows an electric motor according to Embodiment 4 of the present invention.

In FIG. 9, a cooling apparatus 10A includes: a liquid coolant flow channel 11A inside which an internal liquid coolant 12 is sealed; and an external liquid coolant passage portion 13 that is configured so as to enable an external liquid coolant 14 to flow, and that is disposed in a state that is connected to the liquid coolant flow channel 11A.

The liquid coolant flow channel 11A is configured so as to have an annular tubular body in which openings at two axial ends of a rectangular frame-shaped outer circumferential wall 11*c* and a cylindrical inner circumferential wall 11*b* that have different diameters that are disposed coaxially are closed by a pair of end plates, is fixed around an outer circumference of the stator 5 by press-fitting, and is disposed so as to be coaxial to the stator 5. An electric power converting apparatus 8 is mounted to the liquid coolant flow channel 11A so as to cover an opening portion 17 that is formed on the outer circumferential wall 11*c* at a height position that is level with a rotating shaft 3. An opening is formed on a portion that is vertically higher than the outer circumferential wall 11*c*.

The external liquid coolant passage portion 13 is configured so as to have a rectangular parallelepiped box body that has an opening on a lower surface, is disposed on a vertically upper portion of the liquid coolant flow channel 11A such that the opening thereof is aligned with the opening on the outer circumferential wall 11*c*, and is produced integrally with the liquid coolant flow channel 11A so as to communicate with the liquid coolant flow channel 11A.

Moreover, a remainder of the configuration is configured in a similar or identical manner to that of Embodiment 1 above.

In an electric motor 103 that is configured in this manner, because the electric power converting apparatus 8 is positioned vertically lower than the external liquid coolant passage portion 13, the internal liquid coolant 12 that has received heat generated in the electric power converting apparatus 8 and has risen in temperature rises through the liquid coolant flow channel 11A, and exchanges heat with the external liquid coolant 14 at the connecting portion 9 between the external liquid coolant passage portion 13 the liquid coolant flow channel 11A.

Consequently, similar or identical effects to those in Embodiment 1 above can also be achieved in Embodiment 4.

According to Embodiment 4, an outer circumferential wall 11c of the liquid coolant flow channel 11A is configured so as to have a rectangular frame shape. Thus, mountability of the liquid coolant flow channel 11A and the external liquid coolant passage portion 13 is increased, and mountability of the electric power converting apparatus 8 onto the liquid coolant flow channel 11A is also increased.

Embodiment 5

Figure 10:
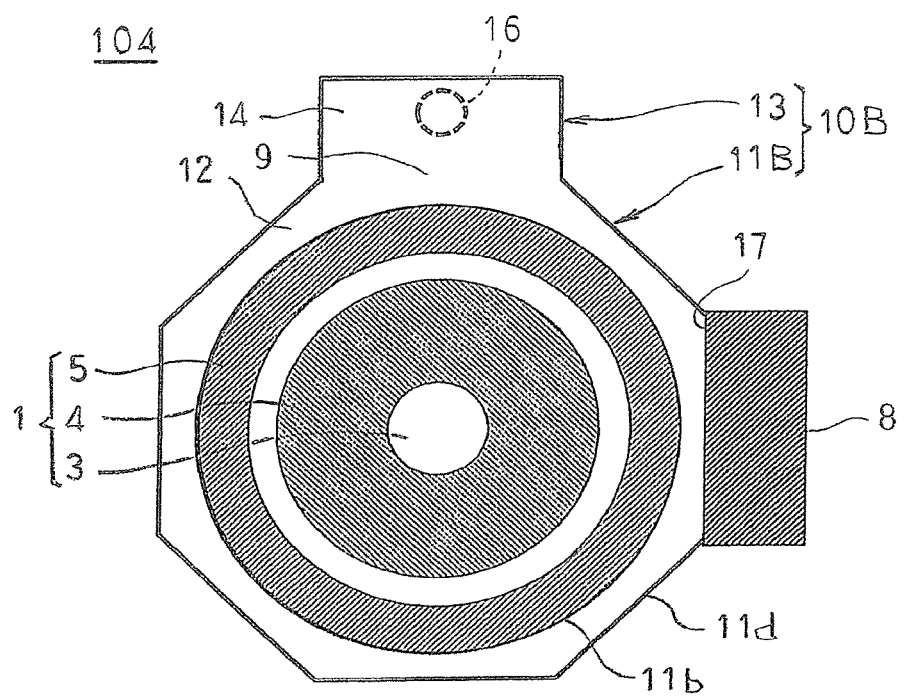
FIG. 10 is a lateral cross section that shows an electric motor according to Embodiment 5 of the present invention.

FIG. 10 is a lateral cross section that shows an electric motor according to Embodiment 5 of the present invention.

In FIG. 10, a cooling apparatus 10B includes: a liquid coolant flow channel 11B inside which an internal liquid coolant 12 is sealed; and an external liquid coolant passage portion 13 that is configured so as to enable an external liquid coolant 14 to flow, and that is disposed in a state that is connected to the liquid coolant flow channel 11B.

The liquid coolant flow channel 11B is configured so as to have an annular tubular body in which openings at two axial ends of an octagonal frame-shaped outer circumferential wall 11d and cylindrical inner circumferential wall 11b that have different diameters that are disposed coaxially are closed by a pair of end plates, is fixed around an outer circumference of the stator 5 by press-fitting, and is disposed so as to be coaxial to the stator 5. An electric power converting apparatus 8 is mounted to the liquid coolant flow channel 11B so as to cover an opening portion 17 that is formed on the outer circumferential wall 11d at a height position that is level with a rotating shaft 3. An opening is formed on a portion that is vertically higher than the outer circumferential wall 11d.

The external liquid coolant passage portion 13 is configured so as to have a rectangular parallelepiped box body that has an opening on a lower surface, is disposed on a vertically upper portion of the liquid coolant flow channel 11B such that the opening thereof is aligned with the opening on the outer circumferential wall 11d, and is produced integrally with the liquid coolant flow channel 11B so as to communicate with the liquid coolant flow channel 11B.

Moreover, a remainder of the configuration is configured in a similar or identical manner to that of Embodiment 1 above.

In an electric motor 104 that is configured in this manner, because the electric power converting apparatus 8 is positioned vertically lower than the external liquid coolant passage portion 13, the internal liquid coolant 12 that has received heat generated in the electric power converting apparatus 8 and has risen in temperature rises through the liquid coolant flow channel 11B, and exchanges heat with the external liquid coolant 14 at the connecting portion 9 between the external liquid coolant passage portion 13 the liquid coolant flow channel 11B.

Consequently, similar or identical effects to those in Embodiment 1 above can also be achieved in Embodiment 5.

According to Embodiment 5, an outer circumferential wall 11d of the liquid coolant flow channel 11B is configured so as to have an octagonal frame shape. Thus, mountability of the liquid coolant flow channel 11B and the external liquid coolant passage portion 13 is increased, and mountability of the electric power converting apparatus 8 onto the liquid coolant flow channel 11B is also increased.

Embodiment 6

Figure 11:
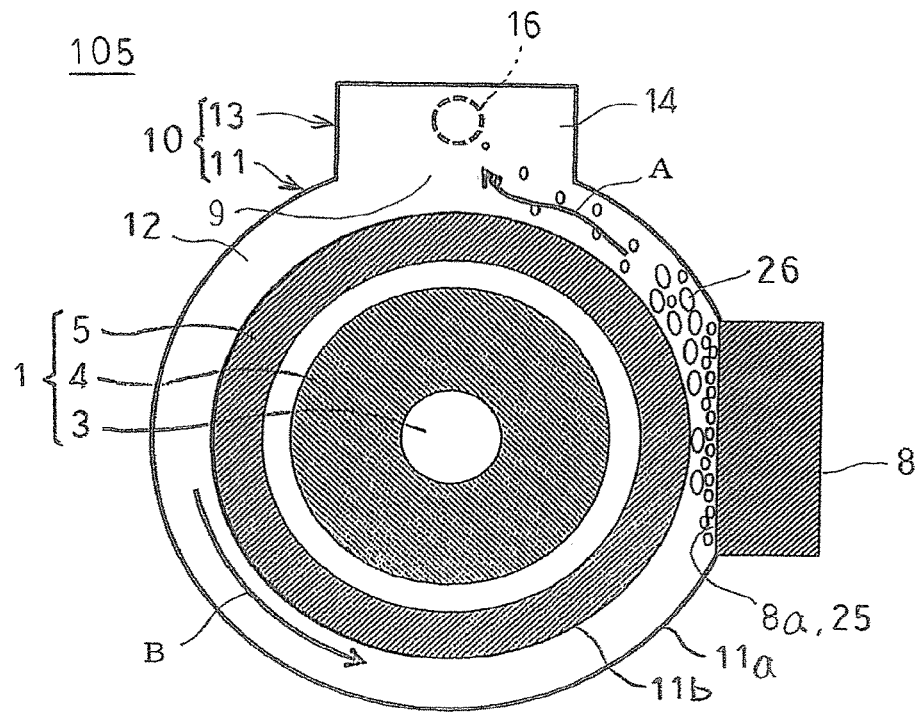
FIG. 11 is a lateral cross section that shows an electric motor according to Embodiment 6 of the present invention.

FIG. 11 is a lateral cross section that shows an electric motor according to Embodiment 6 of the present invention.

In FIG. 11, a boiling inducing portion 25 is formed on a heat radiating surface 8a of an electric power converting apparatus 8. This boiling inducing portion 25 is a portion on which extremely small indentations and protrusions called cavities, that facilitate formation of boiling nuclei, are formed, and is formed on the heat radiating surface 8a by applying routing, sand blasting, metal spraying, redox treatment, etc., to the heat radiating surface 8a. Moreover, in order to facilitate the formation of the boiling nuclei, heat transfer accelerators such as porous bodies, fins, etc., may be installed on the boiling inducing portion 25. The heat transfer accelerators are installed on the boiling inducing portion 25 by brazing, diffusion welding, welding, etc.

Moreover, a remainder of the configuration is configured in a similar or identical manner to that of Embodiment 1 above.

In an electric motor 105 that is configured in this manner, boiling nuclei are formed on the boiling inducing portion 25 of the heat radiating surface 8a due to the generation of heat in the electric power converting apparatus 8, and the internal liquid coolant 12 boils. Vapor bubbles 26 arise together with the boiling of the internal liquid coolant 12. These vapor bubbles 26 have a density that is sufficiently lower than that of the internal liquid coolant 12 to rise through a liquid coolant flow channel 11 as indicated by an arrow A in FIG. 11. The vapor bubbles 26 that have risen vertically upward through the liquid coolant flow channel 11 contact the external liquid coolant 14 at the connecting portion 9 between the liquid coolant flow channel 11 and the external liquid coolant passage portion 13. The vapor bubbles 26 exchange heat with the external liquid coolant 14 and condense to liquid, which descends through the liquid coolant flow channel 11, as indicated by arrow B in FIG. 11. A convection current thereby arises in the internal liquid coolant 12 that is sealed inside the liquid coolant flow channel 11, cooling the electric motor main body 1 and the electric power converting apparatus 8.

Consequently, similar or identical effects to those in Embodiment 1 above can also be achieved in Embodiment 6.

According to Embodiment 6, because the convection of the internal liquid coolant 12 that arises due to upward flow of the vapor bubbles 26 has a faster flow speed than the convection of the internal liquid coolant 12 that arises due to density variations in the internal liquid coolant 12, the electric motor main body 1 and the electric power converting apparatus 8 can be cooled effectively.

Moreover, in Embodiment 6 above, the boiling inducing portion 25 is formed on the heat radiating surface 8a of the electric power converting apparatus 8 that is exposed inside the liquid coolant flow channel 11, but if the electric power converting apparatus 8 is attached externally in a state in which the heat radiating surface 8a contacts the outer circumferential wall 11a of the liquid coolant flow channel 11, then the boiling inducing portion 25 should be formed in a region on the inner circumferential surface of the outer circumferential wall 11a that overlaps with the heat radiating surface 8a of the electric power converting apparatus 8 when viewed from a thickness direction of the outer circumferential wall 11a.

In Embodiment 6 above, the boiling inducing portion 25 is formed on the heat radiating surface 8a of the electric power converting apparatus 8 according to Embodiment 1 above, but similar or identical effects can be achieved if a boiling inducing portion 25 is formed on the heat radiating surface 8a of the electric power converting apparatus 8 according to other embodiments.

Embodiment 7

Figure 12:
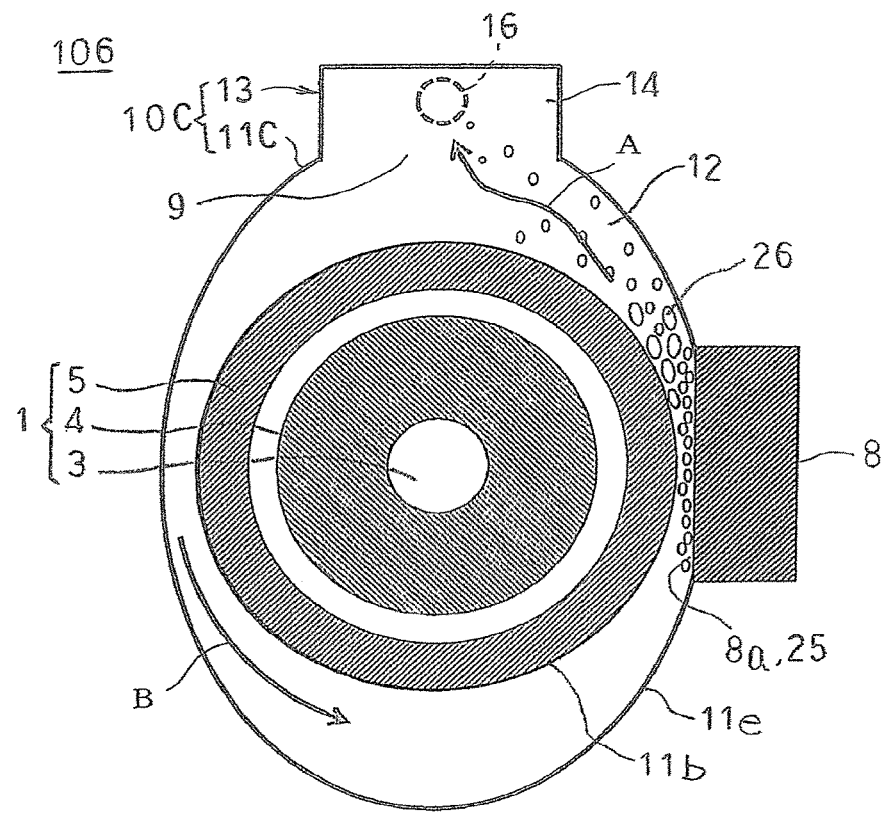
FIG. 12 is a lateral cross section that shows an electric motor according to Embodiment 7 of the present invention.

FIG. 12 is a lateral cross section that shows an electric motor according to Embodiment 7 of the present invention.

In FIG. 12, a cooling apparatus 10C includes: a liquid coolant flow channel 11C inside which an internal liquid coolant 12 is sealed; and an external liquid coolant passage portion 13 that is configured so as to enable an external liquid coolant 14 to flow, and that is disposed in a state that is connected to the liquid coolant flow channel 11C.

The liquid coolant flow channel 11C is configured so as to have an annular tubular body in which openings at two axial ends of an elliptical tubular outer circumferential wall 11e and a cylindrical inner circumferential wall 11b that have different diameters that are disposed coaxially are closed by a pair of end plates, is fixed around an outer circumference of the stator 5 by press-fitting, and is disposed so as to be coaxial to the stator 5. An electric power converting apparatus 8 is mounted to the liquid coolant flow channel 11C so as to cover an opening portion 17 that is formed on the outer circumferential wall 11e at a height position that is level with a rotating shaft 3. A boiling inducing portion 25 is formed on a heat radiating surface 8a of the electric power converting apparatus 8. An opening is formed on a portion that is vertically higher than the outer circumferential wall 11e.

The external liquid coolant passage portion 13 is configured so as to have a rectangular parallelepiped box body that has an opening on a lower surface, is disposed on a vertically upper portion of the liquid coolant flow channel 11C such that the opening thereof is aligned with the opening on the outer circumferential wall 11e, and is produced integrally with the liquid coolant flow channel 11C so as to communicate with the liquid coolant flow channel 11C.

Moreover, a remainder of the configuration is configured in a similar or identical manner to that of Embodiment 1 above.

In an electric motor 106 that is configured in this manner, boiling nuclei are formed on the boiling inducing portion 25 of the heat radiating surface 8a due to the generation of heat in the electric power converting apparatus 8, and the internal liquid coolant 12 boils. Vapor bubbles 26 arise together with the boiling of the internal liquid coolant 12. These vapor bubbles 26 have a density that is sufficiently lower than that of the internal liquid coolant 12 to rise through a liquid coolant flow channel 11 as indicated by an arrow A in FIG. 12. The vapor bubbles 26 that have risen vertically upward through the liquid coolant flow channel 11 contact the external liquid coolant 14 in the external liquid coolant passage portion 13. The vapor bubbles 26 exchange heat with the external liquid coolant 14 and condense to liquid, which descends through the liquid coolant flow channel 11, as indicated by an arrow B in FIG. 12. A convection current thereby arises in the internal liquid coolant 12 that is sealed inside the liquid coolant flow channel 11C, cooling the electric motor main body 1 and the electric power converting apparatus 8.

Consequently, similar or identical effects to those in Embodiment 1 above can also be achieved in Embodiment 7.

According to Embodiment 7, because the outer circumferential wall 11e is produced so as to have an elliptical tubular shape, and the inner circumferential wall 11b is produced so as to have a cylindrical shape, the distance between the heat radiating surface 8a of the electric power converting apparatus 8 and the inner circumferential wall 11b is narrower. Thus, the vapor bubbles 26 that arise together with boiling integrate with each other, forming larger vapor bubbles 26. Flow speed of the convection of the internal liquid coolant 12 that arises due to upward flow of the enlarged vapor bubbles 26 is even faster, enabling the electric motor main body 1 and the electric power converting apparatus 8 to be cooled more effectively.

Moreover, in Embodiment 7 above, an elliptical tubular outer circumferential wall 11e and a cylindrical inner circumferential wall 11b are disposed coaxially, to make a radial width of a flow channel narrower in a vicinity of an electric power converting apparatus 8, but the construction for making the radial width of the flow channel narrower in the vicinity of the electric power converting apparatus 8 is not limited thereto, and a radial width of a flow channel may be made narrower in a vicinity of an electric power converting apparatus 8 by disposing a cylindrical outer circumferential wall 11a and inner circumferential wall 11b so as to be eccentric, for example.

Embodiment 8

Figure 13:
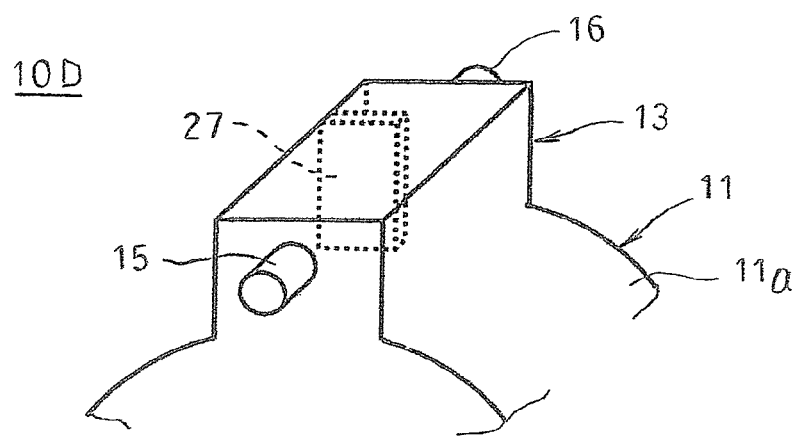
FIG. 13 is a partial oblique projection that shows a vicinity of an external liquid coolant passage portion of an electric motor according to Embodiment 8 of the present invention.

FIG. 13 is a partial oblique projection that shows a vicinity of an external liquid coolant passage portion of an electric motor according to Embodiment 8 of the present invention.

In FIG. 13, a cooling apparatus 10D includes a liquid directing plate 27 that is disposed inside an external liquid coolant passage portion 13, and that changes a direction of flow of external liquid coolant 14 that has flowed in through an inflow port 15 so as to be led to a liquid coolant flow channel 11.

Moreover, a remainder of the configuration is configured in a similar or identical manner to that of Embodiment 1 above.

In Embodiment 8, external liquid coolant 14 that has flowed in through the inflow port 15 collides with the liquid directing plate 27. A portion of the external liquid coolant 14 that has collided with the liquid directing plate 27 flows toward the liquid coolant flow channel 11, and a remaining portion flows toward the outflow port 16. The external liquid coolant 14 that flows toward the liquid coolant flow channel 11 descends through a flow channel inside the liquid coolant flow channel 11 on an opposite side from the electric power converting apparatus 8, and then rises though a flow channel inside the liquid coolant flow channel 11 in a vicinity of the electric power converting apparatus 8 and returns to the external liquid coolant passage portion 13. Thus, because forced convection arises inside the liquid coolant flow channel 11 due to the portion of the external liquid coolant 14 that has collided with the liquid directing plate 27 flowing through the liquid coolant flow channel 11, the electric motor main body 1 and the electric power converting apparatus 8 can be cooled effectively.

Here, the flow rate of the external liquid coolant 14 flowing into the liquid coolant flow channel 11 can be set freely by adjusting the shape of the liquid directing plate 27 and the installation angle thereof relative to the direction of flow of the external liquid coolant 14 that flows in through the inflow port 15. Thus, the shape and the installation angle of the liquid directing plate 27 should be set in response to the cooling capacity that is required in order to cool the electric motor main body 1 and the electric power converting apparatus 8.

Because a portion of the external liquid coolant 14 is led into the liquid coolant flow channel 11, the load on the pump 20 for circulating the external liquid coolant 14 is reduced, enabling increases in the size of the pump 20 to be suppressed.

Embodiment 9

Figure 14:
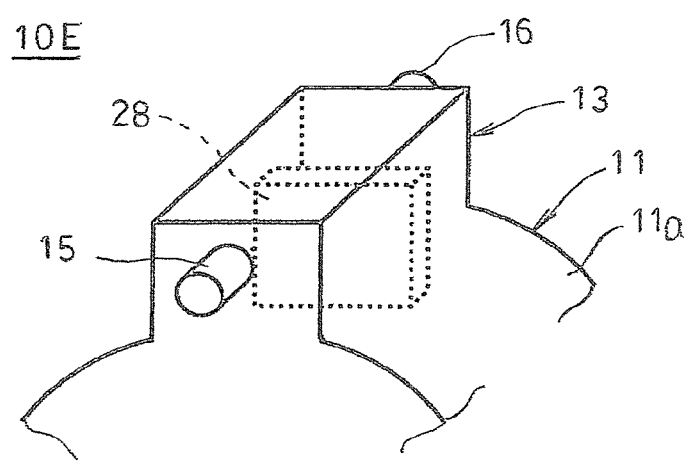
FIG. 14 is a partial oblique projection that shows a vicinity of an external liquid coolant passage portion of an electric motor according to Embodiment 9 of the present invention.

FIG. 14 is a partial oblique projection that shows a vicinity of an external liquid coolant passage portion of an electric motor according to Embodiment 9 of the present invention.

In FIG. 14, a cooling apparatus 10E includes a liquid directing plate 28 that is disposed in an external liquid coolant passage portion 13 so as to protrude into a liquid coolant flow channel 11, and that changes a direction of flow of external liquid coolant 14 that has flowed in through an inflow port 15 so as to be led to a liquid coolant flow channel 11.

Moreover, a remainder of the configuration is configured in a similar or identical manner to that of Embodiment 8 above.

In Embodiment 9, a portion of an external liquid coolant 14 that has flowed in through the inflow port 15 and collided with the liquid directing plate 28 flows toward the liquid coolant flow channel 11, and a remaining portion flows toward the outflow port 16. The external liquid coolant 14 that flows toward the liquid coolant flow channel 11 descends through a flow channel inside the liquid coolant flow channel 11 on an opposite side from the electric power converting apparatus 8, and then rises though a flow channel inside the liquid coolant flow channel 11 in a vicinity of the electric power converting apparatus 8 and returns to the external liquid coolant passage portion 13.

Consequently, similar or identical effects to those in Embodiment 8 above can also be achieved in Embodiment 9.

In Embodiment 9, because the liquid directing plate 28 protrudes into the liquid coolant flow channel 11, the external liquid coolant 14 that collides with the liquid directing plate 28 can be made to flow into the liquid coolant flow channel 11 effectively.

Moreover, in Embodiments 8 and 9, a liquid directing plate is installed in an external liquid coolant passage portion of the cooling apparatus according to Embodiment 1 above, but similar or identical effects can also be achieved if a liquid directing plate is installed in an external liquid coolant passage portion of the cooling apparatus according to other embodiments.

Embodiment 10

Figure 15:
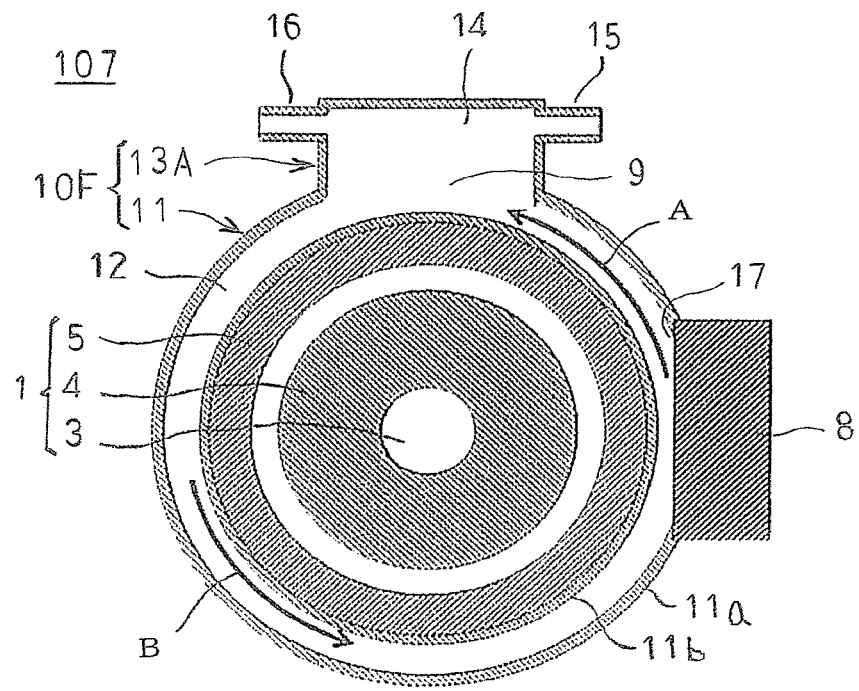
FIG. 15 is a lateral cross section that shows an electric motor according to Embodiment 10 of the present invention.

FIG. 15 is a lateral cross section that shows an electric motor according to Embodiment 10 of the present invention.

In FIG. 15, a cooling apparatus 10F includes: a liquid coolant flow channel 11 inside which an internal liquid coolant 12 is sealed; and an external liquid coolant passage portion 13A that is configured so as to enable an external liquid coolant 14 to flow, and that is disposed in a state that is connected to the liquid coolant flow channel 11.

The external liquid coolant passage portion 13A is configured so as to have a rectangular parallelepiped box body that has an opening on a lower surface, is disposed on a vertically upper portion of the liquid coolant flow channel 11 such that the opening thereof is aligned with the opening on the outer circumferential wall 11a, and is produced integrally with the liquid coolant flow channel 11 so as to communicate with the liquid coolant flow channel 11. An inflow port 15 is mounted to a first circumferential side surface of the external liquid coolant passage portion 13A so as to be parallel to a tangent to an imaginary wall of the outer circumferential wall 11a at the position of a vertical top of the liquid coolant flow channel 11. The direction of the external liquid coolant 14 that flows into the external liquid coolant passage portion 13A from the inflow port 15 is in an identical direction and parallel to a direction of flow of the internal liquid coolant 12 in a vertically upper portion of the liquid coolant flow channel 11, i.e., at a connecting portion 9 between the liquid coolant flow channel 11 and the external liquid coolant passage portion 13A. An outflow port 16 is mounted to a second circumferential side surface of the external liquid coolant passage portion 13A so as to be coaxial to the inflow port 15.

Moreover, a remainder of the configuration is configured in a similar or identical manner to that of Embodiment 1 above.

In an electric motor 107 that is configured in this manner, as indicated by an arrow A in FIG. 15, the internal liquid coolant 12 that receives the heat generated in the electric power converting apparatus 8 rises vertically upward through the liquid coolant flow channel 11, and contacts the external liquid coolant 14 that has flowed into the external liquid coolant passage portion 13A through the inflow port 15. The internal liquid coolant 12 exchanges heat with the external liquid coolant 14, is reduced in temperature, and descends through the liquid coolant flow channel 11, as indicated by an arrow B in FIG. 15. A convection current thereby arises in the internal liquid coolant 12 that is sealed inside the liquid coolant flow channel 11, cooling the electric motor main body 1 and the electric power converting apparatus 8.

Consequently, similar or identical effects to those in Embodiment 1 above can also be achieved in Embodiment 10.

According to Embodiment 10, the direction of inflow of the external liquid coolant 14 into the external liquid coolant passage portion 13A from the inflow port 15 is in an identical direction and parallel to a direction of flow of the internal liquid coolant 12 at the connecting portion 9 between the liquid coolant flow channel 11 and the external liquid coolant passage portion 13A. Thus, the internal liquid coolant 12 mixes together with the external liquid coolant 14 at the connecting portion 9 between the liquid coolant flow channel 11 and the external liquid coolant passage portion 13A, and a portion thereof flows out through the outflow port 16 together with the external liquid coolant 14. A portion of the external liquid coolant 14 that has flowed into the external liquid coolant passage portion 13A descends through the liquid coolant flow channel 11 together with the mixed internal liquid coolant 12, as indicated by an arrow B in FIG. 15. Thus, because forced convection is made to arise inside the liquid coolant flow channel 11 by the portion of the external liquid coolant 14 that has flowed into the external liquid coolant passage portion 13A flowing into the liquid coolant flow channel 11, the electric motor main body 1 and the electric power converting apparatus 8 can be cooled effectively.

Embodiment 11

Figure 16:
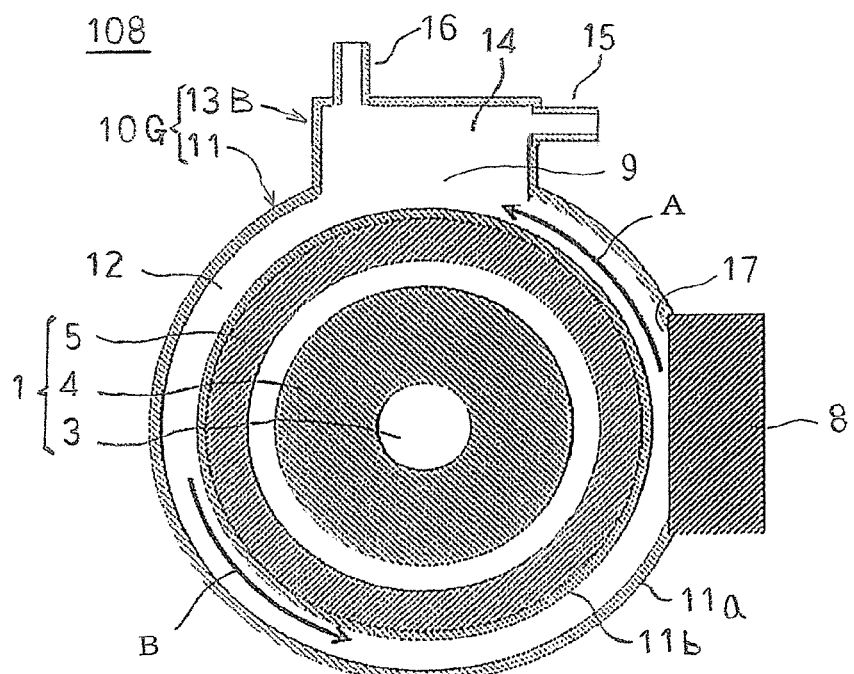
FIG. 16 is a lateral cross section that shows an electric motor according to Embodiment 11 of the present invention.

FIG. 16 is a lateral cross section that shows an electric motor according to Embodiment 11 of the present invention.

In FIG. 16, a cooling apparatus 10G includes: a liquid coolant flow channel 11 inside which an internal liquid coolant 12 is sealed; and an external liquid coolant passage portion 13B that is configured so as to enable an external liquid coolant 14 to flow, and that is disposed in a state that is connected to the liquid coolant flow channel 11.

The external liquid coolant passage portion 13B is configured so as to have a rectangular parallelepiped box body that has an opening on a lower surface, is disposed on a vertically upper portion of the liquid coolant flow channel 11 such that the opening thereof is aligned with the opening on the outer circumferential wall 11a, and is produced integrally with the liquid coolant flow channel 11 so as to communicate with the liquid coolant flow channel 11. An inflow port 15 is mounted to a first circumferential side surface of the external liquid coolant passage portion 13B such that an axial center of the port is parallel to a tangent to an imaginary wall of the outer circumferential wall 11a at the position of a vertical top of the liquid coolant flow channel 11. The direction of the external liquid coolant 14 that flows into the external liquid coolant passage portion 13B from the inflow port 15 is in an identical direction and parallel to a direction of flow of the internal liquid coolant 12 in a vertically upper portion of the liquid coolant flow channel 11, i.e., at a connecting portion 9 between the liquid coolant flow channel 11 and the external liquid coolant passage portion 13B. An outflow port 16 is mounted to a second circumferential side of a vertically upper surface of the external liquid coolant passage portion 13B such that an axial center thereof is perpendicular to the axial center of the inflow port 15 and the axial center of the rotating shaft 3.

Moreover, a remainder of the configuration is configured in a similar or identical manner to that of Embodiment 1 above.

In an electric motor 108 that is configured in this manner, as indicated by an arrow A in FIG. 16, the internal liquid coolant 12 that receives the heat generated in the electric power converting apparatus 8 rises vertically upward through the liquid coolant flow channel 11, and contacts the external liquid coolant 14 that has flowed into the external liquid coolant passage portion 13B through the inflow port 15. The internal liquid coolant 12 exchanges heat with the external liquid coolant 14, is reduced in temperature, and descends through the liquid coolant flow channel 11, as indicated by an arrow B in FIG. 16. A convection current thereby arises in the internal liquid coolant 12 that is sealed inside the liquid coolant flow channel 11, cooling the electric motor main body 1 and the electric power converting apparatus 8.

Consequently, similar or identical effects to those in Embodiment 1 above can also be achieved in Embodiment 11.

According to Embodiment 11, the direction of inflow of the external, liquid coolant 14 into the external liquid coolant passage portion 13B from the inflow port 15 is in an identical direction and parallel to a direction of flow of the internal liquid coolant 12 in a vertically upper portion of the liquid coolant flow channel 11, i.e., at the connecting portion 9 between the liquid coolant flow channel 11 and the external liquid coolant passage portion 13B. Thus, the internal liquid coolant 12 mixes together with the external liquid coolant 14 at the connecting portion 9 between the liquid coolant flow channel 11 and the external liquid coolant passage portion 13B, and a portion thereof flows out through the outflow port 16 together with the external liquid coolant 14. A portion of the external liquid coolant 14 that has flowed into the external liquid coolant passage portion 13B descends through the liquid coolant flow channel 11 together with the mixed internal liquid coolant 12, as indicated by an arrow B in FIG. 16. Thus, because forced convection is made to arise inside the liquid coolant flow channel 11 by the portion of the external liquid coolant 14 that has flowed into the external liquid coolant passage portion 13B flowing into the liquid coolant flow channel 11, the electric motor main body 1 and the electric power converting apparatus 8 can be cooled effectively.

In addition, according to Embodiment 11, because the outflow port 16 is mounted to the second circumferential end of the vertically upper surface of the external liquid coolant passage portion 13B, air present in the external liquid coolant passage portion 13B promptly flows out externally through the outflow port 16, enabling the amount of air remaining in the external liquid coolant passage portion 13B to be reduced.

Embodiment 12

Figure 17:
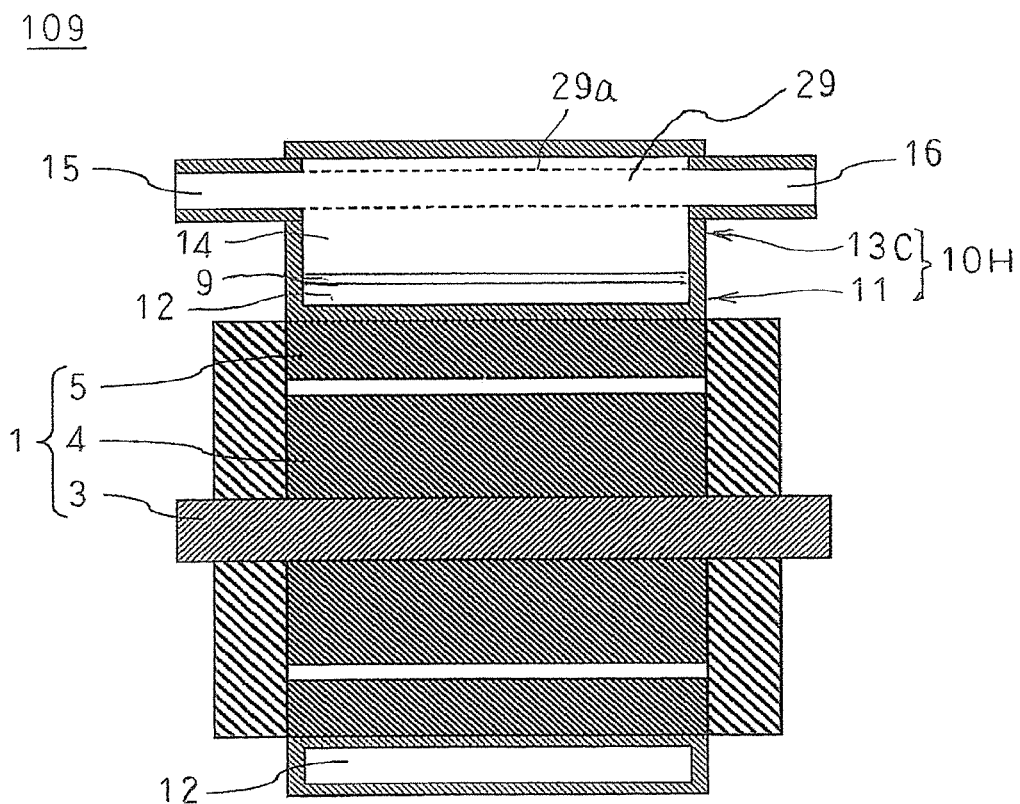
FIG. 17 is a longitudinal cross section that shows an electric motor according to Embodiment 12 of the present invention.

FIG. 17 is a longitudinal cross section that shows an electric motor according to Embodiment 12 of the present invention. Moreover, a "longitudinal cross section" is a diagram representing a cross section that includes a central axis of a rotating shaft of the electric motor.

In FIG. 17, a cooling apparatus 10H includes: a liquid coolant flow channel 11 inside which an internal liquid coolant 12 is sealed; and an external liquid coolant passage portion 13C that is configured so as to enable an external liquid coolant 14 to flow, and that is disposed in a state that is connected to the liquid coolant flow channel 11. The external liquid coolant passage portion 13C includes a perforated tube 29 that links an inflow port 15 and an outflow port 16 internally. Moreover, the perforated tube 29 is a tubular member in which a plurality of apertures 29a that communicate between internal and external portions are formed in a peripheral wall.

The external liquid coolant passage portion 13C is configured so as to have a rectangular parallelepiped box body that has an opening on a lower surface, is disposed on a vertically upper portion of the liquid coolant flow channel 11 such that the opening thereof is aligned with the opening on the outer circumferential wall 11a, and is produced integrally with the liquid coolant flow channel 11 so as to communicate with the liquid coolant flow channel 11. The inflow port 15 is mounted to a first axial end surface of the external liquid coolant passage portion 13C. Similarly, the outflow port 16 is mounted to a second axial end surface of the external liquid coolant passage portion 13C. The inflow port 15 and the outflow port 16 are linked by the perforated tube 29, and the external liquid coolant 14 flows into the perforated tube 29 from the inflow port 15, flows through the perforated tube 29, and flows out externally through the outflow port 16. Here, the external liquid coolant 14 flows out through the apertures of the perforated tube 29, and the external liquid coolant passage portion 13C is filled with the external liquid coolant 14.

Moreover, a remainder of the configuration is configured in a similar or identical manner to that of Embodiment 1 above.

In an electric motor 109 that is configured in this manner, the internal liquid coolant 12 that receives the heat generated in the electric power converting apparatus 8 rises vertically upward through the liquid coolant flow channel 11, and contacts the external liquid coolant 14 that has flowed into the external liquid coolant passage portion 13C through the perforated tube 29. The internal liquid coolant 12 exchanges heat with the external liquid coolant 14, is reduced in temperature, and descends through the liquid coolant flow channel 11. A convection current thereby arises in the internal liquid coolant 12 that is sealed inside the liquid coolant flow channel 11, cooling the electric motor main body 1 and the electric power converting apparatus 8.

Consequently, similar or identical effects to those in Embodiment 1 above can also be achieved in Embodiment 12.

In the cooling apparatus 10 according to Embodiment 1, for example, pressure loss arises when the external liquid coolant 14 flows directly into the external liquid coolant passage portion 13 from the inflow port 15, due to cross-sectional areas that the external liquid coolant 14 passes through being different. Pressure loss also arises when the external liquid coolant 14 flows directly out into the outflow port 16 from the external liquid coolant passage portion 13, due to cross-sectional areas that the external liquid coolant 14 passes through being different.

According to Embodiment 12, the external liquid coolant 14 that flows in through the inflow port 15 flows through the perforated tube 29, and flows out through the outflow port 16. A portion of the external liquid coolant 14 that flows through the perforated tube 29 flows out through the apertures on the perforated tube 29 to the external liquid coolant passage portion 13C. The external liquid coolant 14 that has exchanged heat with the internal liquid coolant 12 also flows into the perforated tube 29 through the apertures on the perforated tube 29. The occurrence of pressure loss is thereby suppressed during inflow of the above-mentioned external liquid coolant 14 into the external liquid coolant passage portion 13C, and during outflow thereof from the external liquid coolant passage portion 13C. Thus, the rate of inflow of the external liquid coolant 14 is not reduced by pressure loss.

In addition, because a portion of the external liquid coolant 14 that flows through the perforated tube 29 flows out to the external liquid coolant passage portion 13C through the apertures on the perforated tube 29, the internal liquid coolant 12 that has risen through the liquid coolant flow channel 11 and the external liquid coolant 14 can contact each other. The rate of inflow of the external liquid coolant 14 can thereby be increased without obstructing cooling of the internal liquid coolant 12.

Moreover, in each of the above embodiments, an automotive electric motor has been explained, but similar effects can also be achieved when applied to other automotive rotary electric machines such as automotive generators or automotive electric motor-generators. In the case of an automotive generator, the electric power converting apparatus is configured so as to convert alternating-current power that is generated by the generator main body into direct-current power. In the case of an automotive electric motor-generator, the electric power converting apparatus is configured so as to convert external direct-current power into alternating-current power, and also to convert the alternating-current power that is generated by the main body into direct-current power.

In each of the above embodiments, a liquid coolant flow channel is fixed to a stator by press-fitting a cylindrical inner circumferential wall onto the stator, but the inner circumferential wall may be omitted, the stator serving also as an inner circumferential wall of the liquid coolant flow channel.

In each of the above embodiments, an electric power converting apparatus is mounted to an outer circumferential wall of a liquid coolant flow channel, but an electric power converting apparatus may be mounted to an end plate that covers openings at two axial ends between an inner circumferential wall and an outer circumferential wall that are disposed coaxially.

In each of the above embodiments, an electric motor is installed such that an axial center of a rotating shaft is horizontal, and a liquid coolant flow channel of a cooling apparatus is installed around an outer circumference of a stator so as to be coaxial to the stator, but it is not absolutely necessary for the electric motor to be installed such that the axial center of the rotating shaft is horizontal, provided that an external liquid coolant passage portion is disposed at a position vertically above a liquid coolant flow channel, and an external liquid coolant that passes through the external liquid coolant passage portion can exchange heat with an internal liquid coolant that has received heat from an electric power converting apparatus and risen through the liquid coolant flow channel.

EXPLANATION OF NUMBERING

1 ELECTRIC MOTOR MAIN BODY (ROTARY ELECTRIC MACHINE, MAIN BODY); 4 ROTOR; 5 STATOR; 8 AN ELECTRIC POWER CONVERTING APPARATUS; 8a HEAT RADIATING SURFACE; 9 CONNECTING PORTION; 10 COOLING APPARATUS; 11 LIQUID COOLANT FLOW CHANNEL; 11b INNER CIRCUMFERENTIAL WALL; 11e OUTER CIRCUMFERENTIAL WALL; 12 INTERNAL LIQUID COOLANT; 13 EXTERNAL LIQUID COOLANT PASSAGE PORTION; 14 EXTERNAL LIQUID COOLANT; 16 OUTFLOW PORT; 25 BOILING INDUCING PORTION; 27, 28 LIQUID DIRECTING PLATE; 29 PERFORATED TUBE.

The invention claimed is:

1. An automotive rotary electric machine in which a rotary electric machine main body performs rotational driving on a vehicle using electric power that is converted by an electric power converting apparatus, said automotive rotary electric machine comprising a cooling apparatus that cools said rotary electric machine main body, wherein:

said cooling apparatus comprises:
an annular internal liquid coolant flow channel that is mounted to said rotary electric machine main body, and in which an internal liquid coolant fully circulates around an outer circumference of said rotary electric machine main body; and
an external liquid coolant passage portion through which an external liquid coolant passes;
said external liquid coolant passage portion is connected to said internal liquid coolant flow channel by a connecting portion that is positioned vertically higher than said rotary electric machine main body; and
said electric power converting apparatus comprises a heat radiating surface that releases heat that is generated in said electric power converting apparatus, said electric power converting apparatus being mounted to said cooling apparatus such that said heat radiating surface and said internal liquid coolant can exchange heat at a position that is vertically lower than a bottom of said connecting portion, wherein
said internal liquid flow channel has an uppermost portion and a lowermost portion in a vertical direction, and is formed into an annular flow channel by a first flow channel and a second flow channel from said uppermost portion to said lowermost portion with said rotary electric machine main body interposed therebetween, and said heat radiating surface exchanges heat with said internal liquid coolant flowing through said first flow channel.

2. The automotive rotary electric machine according to claim 1, wherein said external liquid coolant passage portion comprises:
an inflow port and an outflow port that allow said external liquid coolant to flow in and out; and
a perforated tube that links said inflow port and said outflow port, apertures that communicate between internal and external portions being formed on said perforated tube.

3. The automotive rotary electric machine according to claim 1, wherein said external liquid coolant passage portion is linked to an engine of said vehicle, said external liquid coolant cooling said engine.

4. The automotive rotary electric machine according to claim 1, wherein said rotary electric machine main body comprises:
a rotor; and
a stator that surrounds said rotor,
said internal liquid coolant flow channel being disposed so as to surround said rotary electric machine main body.

5. The automotive rotary electric machine according to claim 4, wherein said internal liquid coolant flow channel is configured so as to have a cylindrical shape and is disposed so as to be coaxial to said rotor.

6. The automotive rotary electric machine according to claim 1, wherein said external liquid coolant passage portion comprises:
an inflow port and an outflow port that allow said external liquid coolant to flow in and out; and
a liquid directing plate that is disposed between said inflow port and said outflow port, and that directs said external liquid coolant that has flowed in through said inflow port vertically lower than said inflow port.

7. The automotive rotary electric machine according to claim 6, wherein a direction of cycling of said internal liquid coolant at said connecting portion is a similar or identical direction to a direction from said inflow port toward said outflow port.

8. The automotive rotary electric machine according to claim 1, wherein
said heat radiating surface is positioned vertically lower than said uppermost portion and vertically higher than said lowermost portion, and
said internal liquid coolant that exchanges heat with said heat radiating surface flows upward from below in said first flow channel.

9. The automotive rotary electric machine according to claim 8, wherein
said external liquid coolant passage portion comprises an inflow port and an outflow port, and
said inflow port and said outflow port are connected to said connecting portion at a position that is vertically higher than said rotary electric machine main body.

10. The automotive rotary electric machine according to claim 1, wherein said heat radiating surface constitutes a portion of a peripheral wall of said internal liquid coolant flow channel.

11. The automotive rotary electric machine according to claim 10, wherein said external liquid coolant passage portion comprises:
an inflow port and an outflow port that allow said external liquid coolant to flow in and out; and
a liquid directing plate that is disposed between said inflow port and said outflow port, and that directs said external liquid coolant that has flowed in through said inflow port vertically lower than said inflow port.

12. The automotive rotary electric machine according to claim 10, wherein said external liquid coolant passage portion comprises:
an inflow port and an outflow port that allow said external liquid coolant to flow in and out; and
a perforated tube that links said inflow port and said outflow port, apertures that communicate between internal and external portions being formed on said perforated tube.

13. The automotive rotary electric machine according to claim 10, wherein said heat radiating surface comprises a boiling inducing portion on which indentations and protrusions are formed, said boiling inducing portion promoting formation of boiling nuclei.

14. The automotive rotary electric machine according to claim 13, wherein said external liquid coolant passage portion comprises:
an inflow port and an outflow port that allow said external liquid coolant to flow in and out; and
a liquid directing plate that is disposed between said inflow port and said outflow port, and that directs said external liquid coolant that has flowed in through said inflow port vertically lower than said inflow port.

15. The automotive rotary electric machine according to claim 13, wherein said external liquid coolant passage portion comprises:
an inflow port and an outflow port that allow said external liquid coolant to flow in and out; and
a perforated tube that links said inflow port and said outflow port, apertures that communicate between internal and external portions being formed on said perforated tube.

16. The automotive rotary electric machine according to claim 1, wherein said heat radiating surface contacts a surface on an opposite side of a peripheral wall of said internal liquid coolant flow channel from said internal liquid coolant.

17. The automotive rotary electric machine according to claim 16, wherein said external liquid coolant passage portion comprises:
an inflow port and an outflow port that allow said external liquid coolant to flow in and out; and
a liquid directing plate that is disposed between said inflow port and said outflow port, and that directs said external liquid coolant that has flowed in through said inflow port vertically lower than said inflow port.

18. The automotive rotary electric machine according to claim 16, wherein said external liquid coolant passage portion comprises:
an inflow port and an outflow port that allow said external liquid coolant to flow in and out; and
a perforated tube that links said inflow port and said outflow port, apertures that communicate between internal and external portions being formed on said perforated tube.

19. The automotive rotary electric machine according to claim 16, wherein an inner circumferential surface of a region of a peripheral wall of said internal liquid coolant flow channel that said heat radiating surface contacts comprises a boiling inducing portion on which indentations and protrusions are formed, said boiling inducing portion promoting formation of boiling nuclei.

20. The automotive rotary electric machine according to claim 19, wherein said external liquid coolant passage portion comprises:
   an inflow port and an outflow port that allow said external liquid coolant to flow in and out; and
   a liquid directing plate that is disposed between said inflow port and said outflow port, and that directs said external liquid coolant that has flowed in through said inflow port vertically lower than said inflow port.

21. The automotive rotary electric machine according to claim 19, wherein said external liquid coolant passage portion comprises:
   an inflow port and an outflow port that allow said external liquid coolant to flow in and out; and
   a perforated tube that links said inflow port and said outflow port, apertures that communicate between internal and external portions being formed on said perforated tube.

* * * * *